United States Patent
Zhang

(10) Patent No.: US 12,347,312 B2
(45) Date of Patent: Jul. 1, 2025

(54) COOPERATIVE VEHICLE-INFRASTRUCTURE PROCESSING METHOD AND APPARATUS, ELECTRONIC DEVICE, AND STORAGE MEDIUM

(71) Applicant: Tencent Technology (Shenzhen) Company Limited, Shenzen (CN)

(72) Inventor: Yunfei Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 293 days.

(21) Appl. No.: 17/975,201

(22) Filed: Oct. 27, 2022

(65) Prior Publication Data

US 2023/0057394 A1  Feb. 23, 2023

Related U.S. Application Data

(63) Continuation of application No. PCT/CN2022/079807, filed on Mar. 9, 2022.

(30) Foreign Application Priority Data

Apr. 25, 2021  (CN) .......................... 202110451237.1

(51) Int. Cl.
*G08G 1/09*  (2006.01)
*G08G 1/01*  (2006.01)
(Continued)

(52) U.S. Cl.
CPC .......... *G08G 1/091* (2013.01); *G08G 1/0125* (2013.01); *H04W 4/12* (2013.01); *H04W 4/44* (2018.02)

(58) Field of Classification Search
CPC ................ G08G 1/091; G08G 1/0125; G08G 1/096783; G08G 1/164; G08G 1/0104;
(Continued)

(56) References Cited

U.S. PATENT DOCUMENTS 11,580,660 B2 * 2/2023 Golinsky ........... G01C 21/3658
2015/0032362 A1  1/2015 Goudy et al.
(Continued)

FOREIGN PATENT DOCUMENTS

CN       106415692 A    2/2017
CN       108780605 A    11/2018
(Continued)

OTHER PUBLICATIONS

Chinese Office Action with English translation, Dec. 17, 2024, pp. 1-32, issued in Chinese Application No. 202110451237.1, State Intellectual Property Office, Guangdong, China.
(Continued)

*Primary Examiner* — Sahar Motazedi
(74) *Attorney, Agent, or Firm* — Crowell & Moring LLP

(57) ABSTRACT

A cooperative vehicle-infrastructure processing method and apparatus, an electronic device, and a computer-readable storage medium are disclosed in embodiments of this application. The method includes: obtaining longitude and latitude position information and absolute elevation information of a traffic object on a road through roadside infrastructure, the traffic object including at least one of a road event, a traffic sign, and a traffic participant; converting the absolute elevation information of the traffic object into a roadside map-based relative elevation representation according to surrounding road network information in a roadside map unit deployed in the roadside infrastructure; and generating a roadside notification message according to the longitude and latitude position information and the relative elevation representation of the traffic object, and broadcasting the roadside notification message, a broadcast range of the roadside notification message covering at least a plurality of roads, so that vehicles on the plurality of roads make vehicle safety early warning decisions based on the
(Continued)

roadside notification message. Technical solutions of the embodiments of this application can achieve a more accurate vehicle safety early warning.

17 Claims, 7 Drawing Sheets

(51) Int. Cl.
  *H04W 4/12* (2009.01)
  *H04W 4/44* (2018.01)
(58) Field of Classification Search
  CPC ......... G08G 1/0141; G08G 1/16; H04W 4/12; H04W 4/44; H04W 4/02; H04W 4/06; H04L 67/10; H04L 67/52; H04L 67/12
  See application file for complete search history.

(56) References Cited

U.S. PATENT DOCUMENTS

| | | | | |
|---|---|---|---|---|
| 2017/0010174 | A1* | 1/2017 | Melen | G01L 27/005 |
| 2017/0018187 | A1* | 1/2017 | Kim | G08G 1/005 |
| 2019/0392708 | A1* | 12/2019 | Tsuda | G05D 1/0088 |
| 2022/0120571 | A1* | 4/2022 | Laverne | G06V 20/54 |
| 2023/0254672 | A1* | 8/2023 | Yin | G01S 19/42 |
| | | | | 701/408 |
| 2024/0015488 | A1* | 1/2024 | Sui | G08G 1/16 |

FOREIGN PATENT DOCUMENTS

| | | | |
|---|---|---|---|
| CN | 111123334 | A | 5/2020 |
| CN | 111721308 | A | 9/2020 |
| CN | 112050819 | A | 12/2020 |
| CN | 112118554 | A | 12/2020 |
| CN | 112384756 | A | 2/2021 |
| CN | 113206874 | A | 8/2021 |
| JP | 2009-093590 | A | 4/2009 |
| WO | WO-2021012243 | A1 * | 1/2021 ........... G01C 21/005 |

OTHER PUBLICATIONS

International Search Report and Written Opinion with English translations, May 9, 2022, pp. 1-17, issued in International Application No. PCT/CN2022/079807, China National Intellectual Property Administration, Beijing, China.

* cited by examiner

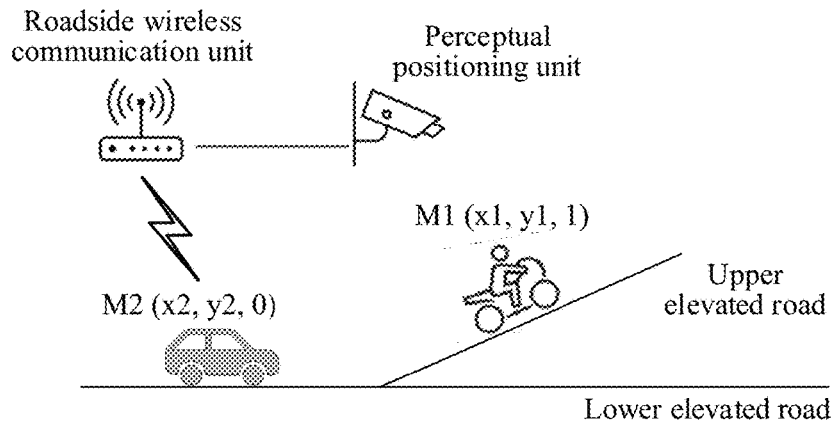

FIG. 7

S410
Determine, according to surrounding road network information of roadside infrastructure, longitude and latitude position information and absolute elevation information of a road section reference point on a road section where the roadside infrastructure is located, and convert the absolute elevation information of the road section reference point into a roadside map-based relative elevation representation, the road section reference point being used to represent a position of the road section where the roadside infrastructure is located S430
Calculate a relative position offset of longitude and latitude position information of a traffic object relative to the longitude and latitude position information of the road section reference point, and calculate a relative elevation offset of a relative elevation representation of the traffic object relative to the relative elevation representation of the road section reference point S450
Add the relative position offset, the relative elevation offset, as well as the longitude and latitude position information and the relative elevation representation of the road section reference point to a roadside notification message to obtain a roadside notification message to be broadcast

FIG. 8

COOPERATIVE VEHICLE-INFRASTRUCTURE PROCESSING METHOD AND APPARATUS, ELECTRONIC DEVICE, AND STORAGE MEDIUM

RELATED APPLICATION

This application is a continuation of International Application No. PCT/CN2022/079807, filed Mar. 9, 2022, which claims priority to Chinese Patent Application No. 202110451237.1, entitled "COOPERATIVE VEHICLE-INFRASTRUCTURE PROCESSING METHOD AND APPARATUS, ELECTRONIC DEVICE, AND STORAGE MEDIUM", and filed with the Chinese Patent Office on Apr. 25, 2021. The contents of International Application No. PCT/CN2022/079807 and Chinese Patent Application No. 202110451237.1 are incorporated herein by reference in their entirety.

FIELD OF THE TECHNOLOGY

This application relates to the field of cooperative vehicle-infrastructure technology, and specifically, to a cooperative vehicle-infrastructure processing method and apparatus, an electronic device, and a computer-readable storage medium.

BACKGROUND OF THE DISCLOSURE

In the cooperative vehicle-infrastructure application, three-dimensional information (including longitude, latitude and elevation) of cooperative vehicle-infrastructure participants, such as a vehicle and roadside infrastructure, is crucial for the large-scale and accurate application of the vehicle-road cooperation. At present, the longitude and latitude information of the cooperative vehicle-infrastructure participants is allowed to be provided to the outside after being processed through deflection and encryption, and the elevation information of the cooperative vehicle-infrastructure participants is not allowed to be directly provided to the outside. In a case that the vehicle cannot obtain the elevation information of other surrounding cooperative vehicle-infrastructure participants, accurate early warning of the vehicle cannot be implemented.

SUMMARY

An embodiment of this application provides a cooperative vehicle-infrastructure processing method, including: obtaining longitude and latitude position information and absolute elevation information of a traffic object on a road through roadside infrastructure, the traffic object including at least one of a road event, a traffic sign, and a traffic participant; converting the absolute elevation information of the traffic object into a roadside map-based relative elevation representation according to surrounding road network information in a roadside map unit deployed in the roadside infrastructure, the relative elevation representation being used to describe a spatial position relationship between the road where the traffic object is located and a plurality of roads around the roadside infrastructure in the surrounding road network information; and generating a roadside notification message according to the longitude and latitude position information and the relative elevation representation of the traffic object, and broadcasting the roadside notification message, a broadcast range of the roadside notification message covering at least the plurality of roads, so that the vehicles on the plurality of roads make vehicle safety early warning decisions based on the roadside notification message.

An embodiment of this application provides a cooperative vehicle-infrastructure processing apparatus, including: a traffic object three-dimensional information obtaining module, configured to obtain longitude and latitude position information and absolute elevation information of a traffic object on a road through roadside infrastructure, the traffic object including at least one of a road event, a traffic sign, and a traffic participant; a traffic object elevation information conversion module, configured to convert the absolute elevation information of the traffic object into a roadside map-based relative elevation representation according to surrounding road network information in a roadside map unit deployed in the roadside infrastructure, the relative elevation representation being used to describe a spatial position relationship between the road where the traffic object is located and a plurality of roads around the roadside infrastructure in the surrounding road network information; and a roadside notification message generation and broadcasting module, configured to generate a roadside notification message according to the longitude and latitude position information and the relative elevation representation of the traffic object, and broadcast the roadside notification message, a broadcast range of the roadside notification message covering at least the plurality of roads, so that the vehicles on the plurality of roads make vehicle safety early warning decisions based on the roadside notification message.

An embodiment of this application provides an electronic device, including a processor and a memory, the memory storing computer-readable instructions, the computer-readable instructions, when executed by the processor, implementing the cooperative vehicle-infrastructure processing method described above.

An embodiment of this application provides a computer-readable storage medium, storing computer-readable instructions, the computer-readable instructions, when executed by a processor of a computer, causing the computer to perform the cooperative vehicle-infrastructure processing method described above.

An embodiment of this application provides a computer program product or a computer program, including computer instructions, the computer instructions being stored in a computer-readable storage medium. A processor of a computer device reads the computer instructions from the computer-readable storage medium, and executes the computer instructions, causing the computer device to perform the cooperative vehicle-infrastructure processing method provided in the foregoing optional embodiments.

It is to be understood that the foregoing general descriptions and the following detailed descriptions are merely exemplary and explanatory, and cannot limit this application.

BRIEF DESCRIPTION OF THE DRAWINGS

The accompanying drawings herein are incorporated into the specification and constitute a part of this specification, show embodiments that conform to this application, and are used for describing the principles of this application together with this specification. Apparently, the accompanying drawings described below are merely some embodiments of this application, and a person of ordinary skill in the art may further obtain other accompanying drawings according to these accompanying drawings without creative efforts. In the accompanying drawings:

FIG. 7 is a schematic diagram of exemplary road network information;

FIG. 8 is a flowchart of roadside infrastructure generating a roadside message according to longitude and latitude position information and a relative elevation representation of a traffic object according to an exemplary embodiment;

DETAILED DESCRIPTION

Exemplary embodiments are described in detail herein, and examples of the exemplary embodiments are shown in the accompanying drawings. When the following descriptions are made with reference to the accompanying drawings, unless indicated otherwise, the same numbers in different accompanying drawings represent the same or similar elements. The implementations described in the following exemplary embodiments do not represent all implementations that are consistent with this application. On the contrary, the implementations are merely examples of apparatuses and methods that are described in detail in the appended claims and that are consistent with some aspects of this application.

The block diagrams shown in the accompanying drawings are merely functional entities and do not necessarily correspond to physically independent entities. That is, such functional entities may be implemented by using software, or implemented in one or more hardware modules or integrated circuits, or implemented in different networks and/or processor apparatuses and/or micro-controller apparatuses.

The flowcharts shown in the accompanying drawings are merely examples for descriptions, do not necessarily include all content and operations/steps, and are not necessarily performed in the described orders. For example, some operations/steps may be further divided, while some operations/steps may be combined or partially combined. Therefore, an actual execution order may vary depending on an actual situation.

"A plurality of" mentioned in this application means two or more. "And/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

First, it is to be noted that cooperative vehicle-infrastructure adopts wireless communication and Internet technologies to comprehensively implement real-time interaction of vehicle-to-vehicle and vehicle-to-infrastructure information, and perform active vehicle safety control and road cooperative management based on acquisition and integration of time-space dynamic traffic information, thus fully realizing effective cooperation of pedestrians, vehicles and infrastructure, ensuring traffic safety and improving traffic efficiency, thereby forming a safe, efficient, and environmentally friendly road traffic system.

Figure 1A:
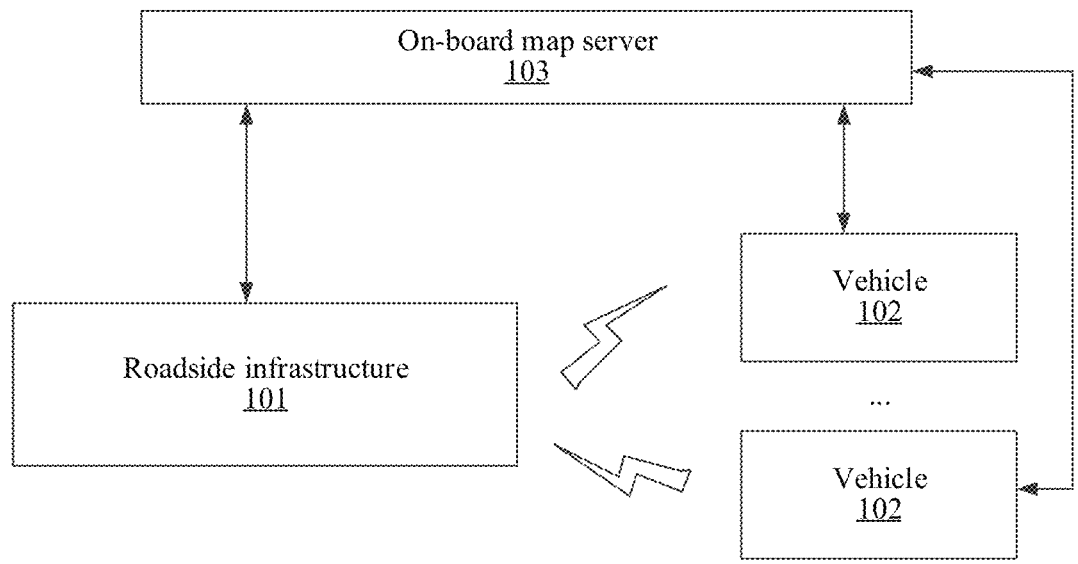
FIG. 1A is a schematic structural diagram of a cooperative vehicle infrastructure system (CVIS) applicable to a cooperative vehicle-infrastructure processing method according to an embodiment of this application.

FIG. 1A is a schematic structural diagram of a CVIS applicable to a cooperative vehicle-infrastructure processing method according to an embodiment of this application. As shown in FIG. 1A, the schematic structural diagram includes roadside infrastructure 101 deployed on a road side, a vehicle 102 and an on-board map server 103.

The roadside infrastructure 101 is deployed on the road side, so that road traffic safety is achieved in cooperation with the roadside infrastructure 101.

The vehicle 102 refers to an intelligent network connected vehicle equipped with a wireless communication unit, which may adopt a Vehicle to Everything (V2X) communication mode.

The on-board map server 103 is configured to provide a map data service for an on-board map unit deployed in the vehicle, and also store a conversion relationship between a roadside map-based relative elevation representation and an on-board map-based relative elevation representation of a same road. The on-board map server may be a cloud server.

Figure 1B:
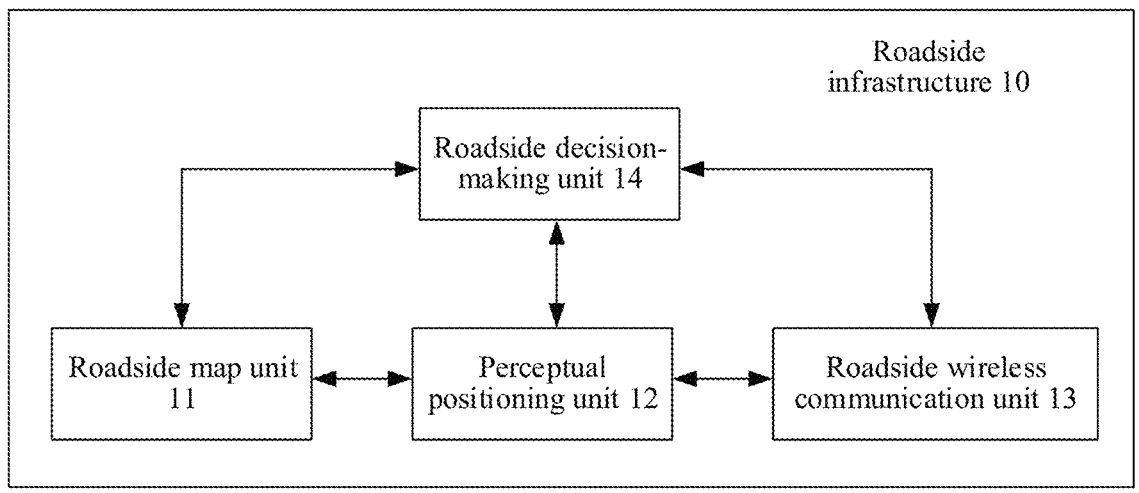
FIG. 1B is a schematic structural diagram of exemplary roadside infrastructure.

In a CVIS involved in this application, the roadside infrastructure is deployed on the road side, so that road traffic safety can be achieved in cooperation with the roadside infrastructure. FIG. 1B is a schematic structural diagram of exemplary roadside infrastructure. As shown in FIG. 1B, a roadside map unit 11, a perceptual positioning unit 12, a roadside wireless communication unit 13 and a roadside decision-making unit 14 are deployed in roadside infrastructure 10. The roadside map unit 11 is configured to maintain surrounding road network information of the roadside infrastructure. The surrounding road network information describes a spatial position relationship between a plurality of roads around the roadside infrastructure 10. The perceptual positioning unit 12 is configured to perceive a traffic object on a road and obtain longitude and latitude information and absolute elevation information of the perceived traffic object. For example, the perceptual positioning unit 12 mainly includes a perceiving module and a positioning module. The perceiving module may be one or more modules with a perceptive function, such as a camera module, a radar module and the like, which is not limited here. The roadside wireless communication unit 13 is configured to transmit various types of messages to the outside, for example, a Road Side Information (RSI) message, a Road Safety Message (RSM), and the like. The roadside wireless communication unit 13 may use V2X (which may be understood as an Internet of Vehicles technology) for communication, and may be, for example, a Road Side Unit (RSU). The roadside decision-making unit 14 is configured to provide a decision-making function of the roadside infrastructure 10 in a cooperative vehicle-infrastructure application scenario.

The roadside infrastructure in an actual application scenario may have more or fewer functional components than those in the schematic structural diagram shown in FIG. 1B. This embodiment of this application does not limit the specific structure of the roadside infrastructure to that shown in FIG. 1B. The components shown in FIG. 1B may be implemented by using hardware, software, or a combination thereof.

Elevation refers to a vertical distance from a point to a datum plane, and absolute elevation refers to a vertical distance from a point to an absolute datum plane. The vertical direction may be interpreted as a direction of a plumb line. Therefore, the absolute elevation may be interpreted as an altitude. At present, it is not allowed to directly provide the absolute elevation information to the outside. As a result, a pilot area and a demonstration area of the current cooperative vehicle-infrastructure mainly achieve cooperative vehicle-infrastructure based on a plane road network.

However, in multi-layer road network scenarios such as urban roads like overpasses, viaducts, interchanges, and highways, if the roadside infrastructure cannot transmit elevation information to the vehicle on the road, or the vehicle on the road cannot effectively distinguish the elevation information transmitted by the roadside infrastructure, the vehicle may issue a false early warning, make an incorrect decision, and the like.

Figure 2:
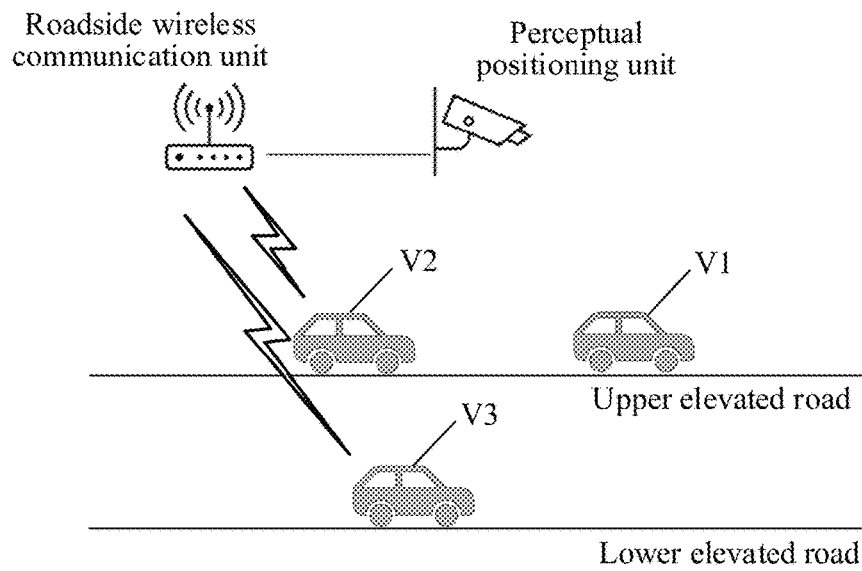
FIG. 2 is a schematic diagram of an exemplary emergency braking early warning scenario implemented based on cooperative vehicle-infrastructure.

For example, in the emergency braking early warning scenario implemented based on the cooperative vehicle-infrastructure as shown in FIG. 2, when a vehicle V1 traveling on an upper elevated road suddenly stops, the perceptual positioning unit deployed in the roadside infrastructure perceives a static state of the vehicle V1, and obtains longitude and latitude position information and absolute elevation information of the vehicle V1. The roadside wireless communication unit deployed in the roadside infrastructure broadcasts the longitude and latitude information of the vehicle V1. A vehicle V2 transmits a vehicle safety warning to a driver of the vehicle V2 with reference to the longitude and latitude position information of vehicle V1. If the roadside infrastructure cannot transmit the elevation information to the outside, or the vehicle V2 cannot effectively distinguish the elevation information transmitted by the roadside infrastructure, a vehicle V3 traveling on a lower elevated road may issue a vehicle safety warning to a driver of the vehicle V3 according to the longitude and latitude position information of the vehicle V1, thus causing a decision-making error of the vehicle V3.

It is to be understood that the upper elevated road and the lower elevated road shown in FIG. 2 refer to two elevated roads with the same longitude and latitude position information and different absolute elevation information. The absolute elevation of the upper elevated road is greater than the absolute elevation of the lower elevated road. That is, a vertical distance between the upper elevated road and the ground is greater than a vertical distance between the lower elevated road and the ground.

The actual road network situation may be more complex than that shown in FIG. 2. If the roadside infrastructure cannot transmit the elevation information to the outside, or the vehicle cannot effectively distinguish the elevation information transmitted by the roadside infrastructure, a serious traffic accident is likely to occur.

Therefore, how to formulate a reasonable cooperative vehicle-infrastructure solution while the elevation information is not allowed to be provided to the outside is a technical problem that requires constant research by a person skilled in the art.

To solve the foregoing problem, the embodiments of this application propose a cooperative vehicle-infrastructure processing method, a cooperative vehicle-infrastructure processing apparatus, an electronic device and a computer-readable storage medium to improve the accuracy of the safety early warning of the vehicle in a cooperative vehicle-infrastructure application.

The vehicle mentioned in the embodiments of this application refers to an intelligent network connected vehicle equipped with a wireless communication unit that may adopt a V2X communication mode. For example, in a schematic structural diagram of an exemplary vehicle shown in FIG. 3, an on-board map unit 21, a positioning and navigation unit 22, an in-vehicle wireless communication unit 23, and an in-vehicle decision-making unit 24 are deployed in a vehicle 20. The on-board map unit 21 is configured to provide map information for the vehicle 20. The positioning and navigation unit 22 is configured to provide positioning and navigation functions for the vehicle 20. The in-vehicle wireless communication unit 23 is configured to communicate with roadside infrastructure. The in-vehicle decision-making unit 24 is configured to provide a decision-making function of the vehicle 20 in the cooperative vehicle-infrastructure application, a safety warning decision for the vehicle 20.

Figure 3:
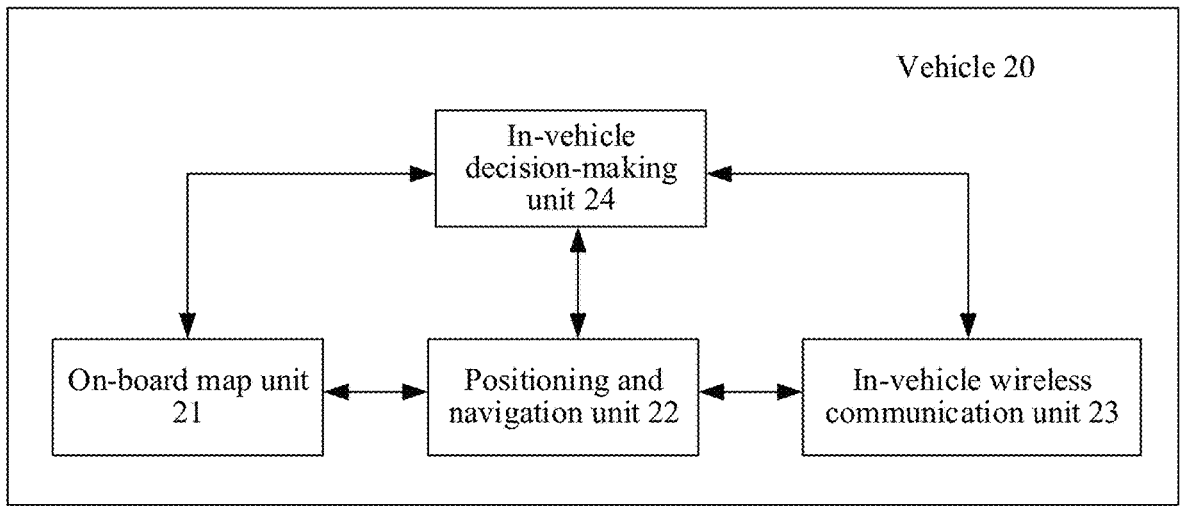
FIG. 3 is a schematic structural diagram of an exemplary vehicle.

In the actual cooperative vehicle-infrastructure application scenario, the vehicle may include more or fewer component units than those shown in FIG. 3. The components shown in FIG. 3 may be implemented by using hardware, software, or a combination thereof.

It is to be noted that, in this embodiment of this application, the roadside infrastructure transmits information represented by the relative elevation of the traffic object to the outside, rather than absolute elevation information. The relative elevation usually refers to a vertical distance from a point to a relative base plane. The relative elevation mentioned in this application is used to describe a spatial position relationship of a road with specific longitude and latitude position information in a vertical direction, such as a road layer number in the vertical direction, rather than a distance in the vertical direction. For example, if a relative elevation of a road in the vertical direction is denoted by A, a relative elevation of another road in the vertical direction is denoted by B, and A and B are not equal, it is determined that the two roads are located at different layers, that is, they are two different roads. The following describes the cooperative vehicle-infrastructure processing method, the cooperative vehicle-infrastructure processing apparatus, the electronic device and the computer-readable storage medium proposed in this application by using more detailed embodiments.

Figure 4A:
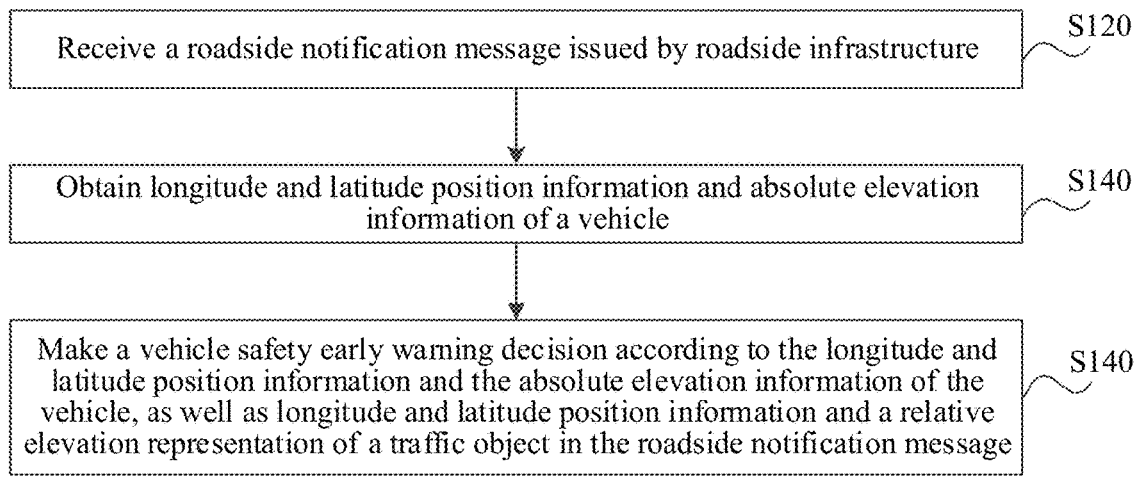
FIG. 4A is a flowchart of a cooperative vehicle-infrastructure processing method according to an exemplary embodiment.

FIG. 4A is a flowchart of a cooperative vehicle-infrastructure processing method according to an exemplary embodiment. As shown in FIG. 4, the method is performed by roadside infrastructure in a CVIS and includes at least step S110 to step S150. A detailed description is as follows:

Step S110: Obtain longitude and latitude position information and absolute elevation information of a traffic object on a road through roadside infrastructure, the traffic object including at least one of a road event, a traffic sign, and a traffic participant.

As mentioned above, the roadside infrastructure is a facility deployed on a roadside in a cooperative vehicle-infrastructure application and is configured to assist in realizing safety early warning of a vehicle in the cooperative vehicle-infrastructure application. A roadside map unit and a perceptual positioning unit are deployed in the roadside infrastructure. The roadside map unit contains surrounding road network information of the roadside infrastructure. The perceptual positioning unit is configured to perceive a traffic object within a perception range, and position the perceived traffic object, to obtain longitude and latitude position information and absolute elevation information of the traffic object.

If the perceptual positioning unit provides a perceptual capability through a camera module or a radar module, the perception range of the perceptual positioning unit is an image collection range of the camera module or a detection range of the radar module. The perceptual positioning unit may further perceive the traffic object on the road in combination with various perceptual means, which is not limited here.

The traffic object on the road includes but is not limited to a road event, a traffic sign and a traffic participant. The road event includes events that affect vehicle driving safety, such as discards on the road, ice on the road, a retrograde vehicle on the road. The traffic sign includes a speed limit sign, a speed measurement sign, and the like. The traffic participant includes a pedestrian, a non-motor vehicle, a motor vehicle, and the like. The specific type of the traffic object may be determined according to an actual application scenario.

In this embodiment, the longitude and latitude position information and the absolute elevation information of the traffic object on the road are obtained through the roadside infrastructure, to perceive factors that affect the vehicle driving safety on the road through the roadside infrastructure. In this embodiment, position information of these factors are obtained and broadcast, so that the vehicle on the road may make a vehicle safety early warning decision according to the position information of these factors, thereby improving the vehicle driving safety.

Step S130: Convert the absolute elevation information of the traffic object into a roadside map-based relative elevation representation according to surrounding road network information in a roadside map unit deployed in the roadside infrastructure, the surrounding road network information in the roadside map unit being used to describe a spatial position relationship between a plurality of roads around the roadside infrastructure.

Since the roadside infrastructure is not allowed to directly provide the absolute elevation information to the outside at present, in this embodiment, the absolute elevation information of the traffic object obtained in step S110 needs to be converted into the relative elevation representation, and then the relative elevation representation of the traffic object is provided to the outside to meet the requirements of national security and relevant laws and regulations.

In this embodiment, the roadside map-based relative elevation representation is used to describe a spatial position relationship between the road where the traffic object is located and the plurality of roads around the roadside infrastructure in the surrounding road network information of the roadside infrastructure. For example, a layer relationship between the road where the traffic object is located and the plurality of roads may be determined through the relative elevation representation.

Specifically, in this embodiment, the absolute elevation information of the traffic object needs to be converted into the relative elevation representation according to the surrounding road network information in the roadside map unit deployed in the roadside infrastructure. The surrounding road network information in the roadside map unit is used to describe the spatial position relationship between the plurality of roads around the roadside infrastructure. That is, the relative elevation representation of the traffic object is obtained based on a condition of the surrounding roads of the roadside infrastructure. Therefore, the obtained relative elevation representation of the traffic object is the roadside map-based relative elevation representation.

The roadside map unit stores map information of the road network around the roadside infrastructure, and maintains longitude and latitude position information and absolute elevation information of all road sections of the surrounding road network within the coverage of the roadside map unit. An end point of a road section is also known as a road section node. A road section usually has two road section nodes, and a center of the two road section nodes is a road section reference point on the road section. The position of the road section is represented by the road section reference point.

The roadside map unit is provided with a first relative elevation representation rule, which describes a method for determining relative elevation representations of the roads according to the spatial position relationship between the plurality of roads around the roadside infrastructure. The relative elevation is usually a value having nothing to do with the absolute elevation, and the relative elevation representations of the plurality of roads are different from each other. The spatial position relationship between the plurality of roads may be determined according to the relative elevation representations of the plurality of roads.

Therefore, in this embodiment, the absolute elevation information of the traffic object may be converted into the roadside map-based relative elevation representation according to the first relative elevation representation rule. Details of the first relative elevation representation rule are provided by the roadside map unit and may be determined according to the actual application scenario.

Step S150: Generate a roadside notification message according to the longitude and latitude position information and the relative elevation representation of the traffic object, and broadcast the roadside notification message, a broadcast range of the roadside notification message covering at least the plurality of roads, so that vehicles on the plurality of roads make vehicle safety early warning decisions based on the roadside notification message.

After the roadside map-based relative elevation representation of the traffic object is obtained, the roadside notification message is generated according to the longitude and latitude position information and the relative elevation representation of the traffic object, and the roadside notification message is broadcast. For example, the roadside notification message may be broadcast through the wireless communication unit, which may be an RSU unit, deployed in the roadside infrastructure.

The broadcast range of the roadside notification message covers at least the plurality of roads around the roadside infrastructure, so that vehicles traveling on the roads around the roadside infrastructure make vehicle safety early warning decisions based on the roadside notification message.

In the technical solutions provided in this embodiment of this application, after the roadside infrastructure obtains the absolute elevation information of the traffic object on the road, the absolute elevation information of the traffic object is replaced with a relative elevation representation, which meets the requirement that it is not allowed to directly provide the elevation information to the outside. Meanwhile, this application implements the safety early warning of the vehicle on the road in cooperation with the roadside infrastructure. The roadside infrastructure can identify the road event, the traffic object, the traffic participant and other traffic objects on the road, and broadcast the longitude and latitude position information and the relative elevation representation of the traffic object, so that the vehicle in the cooperative vehicle-infrastructure application can implement a more accurate vehicle safety early warning based on the relevant information of the traffic object.

After receiving the roadside notification message broadcast by the roadside infrastructure, the vehicle in the cooperative vehicle-infrastructure application can analyze the roadside notification message to obtain the longitude and latitude position information and the roadside map-based relative elevation representation of the traffic object. The longitude and latitude position information and the absolute elevation information of the vehicle are obtained, so as to make a vehicle safety early warning decision according to the longitude and latitude position information and the absolute elevation information of the vehicle, as well as the longitude and latitude position information and the relative elevation representation of the traffic object.

Figure 4B:
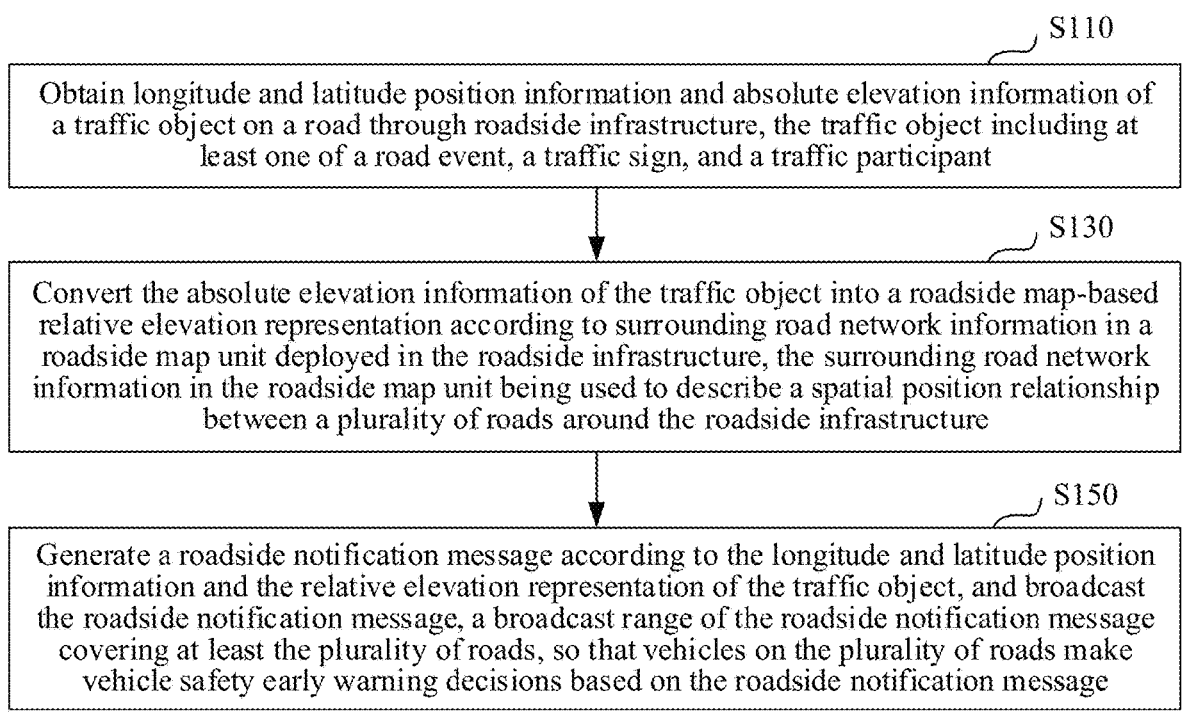
FIG. 4B is a flowchart of a cooperative vehicle-infrastructure processing method according to an exemplary embodiment.

FIG. 4B is a flowchart of a cooperative vehicle-infrastructure processing method according to an exemplary embodiment. As shown in FIG. 4B, the method is performed by a vehicle in a CVIS and includes at least step S120 to step S160. A detailed description is as follows:

Step S120: Receive a roadside notification message issued by roadside infrastructure, the roadside notification message being generated by the roadside infrastructure according to longitude and latitude position information and a relative elevation representation of a traffic object, the traffic object including at least one of a road event, a traffic sign, and a traffic participant.

In some embodiments, the vehicle refers to an intelligent network connected vehicle equipped with a wireless communication unit which may adopt a V2X communication mode. An on-board map unit, a positioning and navigation unit, an in-vehicle wireless communication unit and an in-vehicle decision-making unit are deployed in the vehicle. The in-vehicle wireless communication unit is configured to communicate with the roadside infrastructure. Here, the in-vehicle wireless communication unit may receive roadside notification messages issued by the roadside infrastructure.

Step S140: Obtain longitude and latitude position information and absolute elevation information of the vehicle.

Step S160: Make a vehicle safety early warning decision according to the longitude and latitude position information and the absolute elevation information of the vehicle, as well as the longitude and latitude position information and the relative elevation representation of the traffic object in the roadside notification message.

Figure 5:
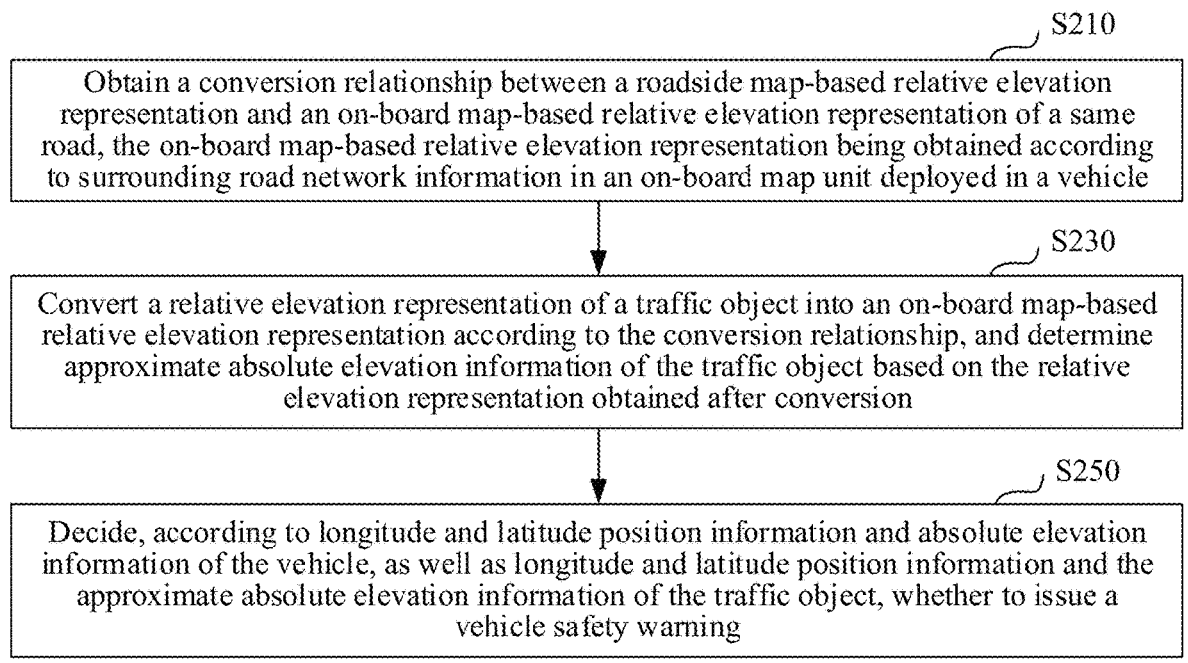
FIG. 5 is a flowchart of a vehicle making a vehicle safety early warning decision in a cooperative vehicle-infrastructure application according to an exemplary embodiment.

FIG. 5 is a flowchart of a vehicle making a vehicle safety early warning decision in a cooperative vehicle-infrastructure application according to an exemplary embodiment. As shown in FIG. 5, a decision-making procedure includes step S210 to step S250. A detailed description is as follows:

Step S210: Obtain a conversion relationship between a roadside map-based relative elevation representation and an on-board map-based relative elevation representation of a same road, the on-board map-based relative elevation representation being obtained according to surrounding road network information in an on-board map unit deployed in the vehicle.

First, it is to be noted that an on-board map-based relative elevation representation of a road is obtained according to the surrounding road network information in the on-board map unit deployed in the vehicle. The surrounding road network information is surrounding road network information of the current vehicle, which contains a spatial position relationship between a plurality of roads around the current vehicle. Therefore, the roadside map-based relative elevation representation is used to describe a spatial position relationship between the road where the vehicle is located and a plurality of roads around the vehicle. For example, a layer relationship between the road where the vehicle is located and the plurality of roads may be determined through the relative elevation representation.

The function of the on-board map unit is similar to that of the roadside map unit, but there are differences. For example, the representation of the relative elevation in the on-board map unit may be different from that in the roadside map unit. For example, the on-board map unit is provided with a second relative elevation representation rule, which describes a method for obtaining relative elevation representations of the roads according to the spatial position relationship between the plurality of roads around the vehicle. The second relative elevation representation rule may be different from the first relative elevation representation rule specified in the roadside map unit.

Therefore, in this embodiment, a conversion relationship between a roadside map-based relative elevation representation and an on-board map-based relative elevation representation of a same road needs to be obtained, so that the on-board map unit and the roadside map unit have a unified understanding of the relative elevation representation of the same road based on the conversion relationship, to ensure the accuracy of subsequent vehicle safety early warning decision.

In some embodiments, the conversion relationship between a roadside map-based relative elevation representation and an on-board map-based relative elevation representation of a same road is obtained from an on-board map server, which is configured to provide a map data service for the on-board map unit deployed in the vehicle. The on-board map server communicates with the roadside map unit and the on-board map unit. The conversion relationship is maintained in the on-board map. For example, when roadside map-based relative elevations of one or more roads in the roadside map unit have changed, the on-board map server updates conversion relationships corresponding to these roads accordingly, and synchronize the updated conversion relationships to the on-board map unit. The on-board map server may be a cloud server.

Step S230: Convert the relative elevation representation of the traffic object into an on-board map-based relative elevation representation according to the conversion relationship, and determine approximate absolute elevation information of the traffic object based on the relative elevation representation obtained through conversion.

In this embodiment, according to the conversion relationship obtained in step S210, the roadside map-based relative elevation representation of the traffic object can be converted into an on-board map-based relative elevation representation, and then, according to the understanding of the on-board map unit for the relative elevation representation, approximate absolute elevation information of the traffic object can be determined based on the relative elevation representation obtained through conversion.

Exemplarily, the on-board map unit can determine, according to the relative elevation representation obtained through conversion, a road layer number corresponding to the road where the traffic object is located in the surrounding road network information of the vehicle. The approximate absolute elevation information of the traffic object may be determined according to the road layer number and map data corresponding to the surrounding road network information of the vehicle. The approximate absolute elevation information obtained in this embodiment according to the road layer number of the road where the target vehicle is located and the map data of this road layer in the in-vehicle road unit is a value approximate to real absolute elevation information of the vehicle.

Step S250: Determine, according to the longitude and latitude position information and the absolute elevation information of the vehicle, as well as the longitude and latitude position information and the approximate absolute elevation information of the traffic object, whether to issue a vehicle safety warning.

In different cooperative vehicle-infrastructure application scenarios, a decision logic of whether to issue a vehicle safety warning according to the longitude and latitude position information and the absolute elevation information of the vehicle, as well as the longitude and latitude position information and the approximate absolute elevation information of the traffic object may be different.

For example, in the emergency braking early warning scenario shown in FIG. 2, after receiving a roadside notification message broadcast by the roadside infrastructure, a vehicle V2 determines that the vehicle V2 and a vehicle V1 are traveling on the same road according to the absolute elevation information of the vehicle V2 and approximate absolute elevation information of the vehicle V1, and further generates a safety prompt message according to longitude and latitude position information of the vehicle V2 and longitude and latitude position information of the vehicle V1. For example, the safety prompt message warns a driver of the vehicle V2 of a distance between the vehicle V2 and the vehicle V1, and prompts whether a braking measure needs to be taken. A vehicle V3 can identify that the vehicle V1 is on the road at a different layer, and a static state of the vehicle V1 does not affect the safety of the vehicle V3. Therefore, no safety warning is issued to the vehicle V3.

For another example, in an overspeed early warning scenario based on the cooperative vehicle-infrastructure, the traffic object obtained by the roadside infrastructure is a speed limit sign. After the roadside infrastructure broadcasts longitude and latitude position information and relative elevation representation of the speed limit sign, a vehicle on the road around the roadside infrastructure can determine whether the speed limit sign is located on a current road of the vehicle according to the relative elevation representation of the speed limit sign. If yes, a distance between the vehicle and the speed limit sign may be further obtained according to longitude and latitude position information of the vehicle and the longitude and latitude position information of the speed limit sign to issue a vehicle safety warning according to the distance. Otherwise, there is no need to issue a vehicle safety warning.

It can be seen that in this embodiment, three-dimensional position information (x1, y1, z1) of the vehicle is compared with three-dimensional position information (x2, y2, z2) of the traffic object to decide whether to issue a vehicle safety warning, which can achieve accurate early warning for the vehicle. z1 represents absolute elevation information of the vehicle, and z2 represents approximate absolute elevation information of the traffic object. The absolute elevation information of the vehicle may be obtained through a navigation and positioning unit deployed in the vehicle.

Figure 6:
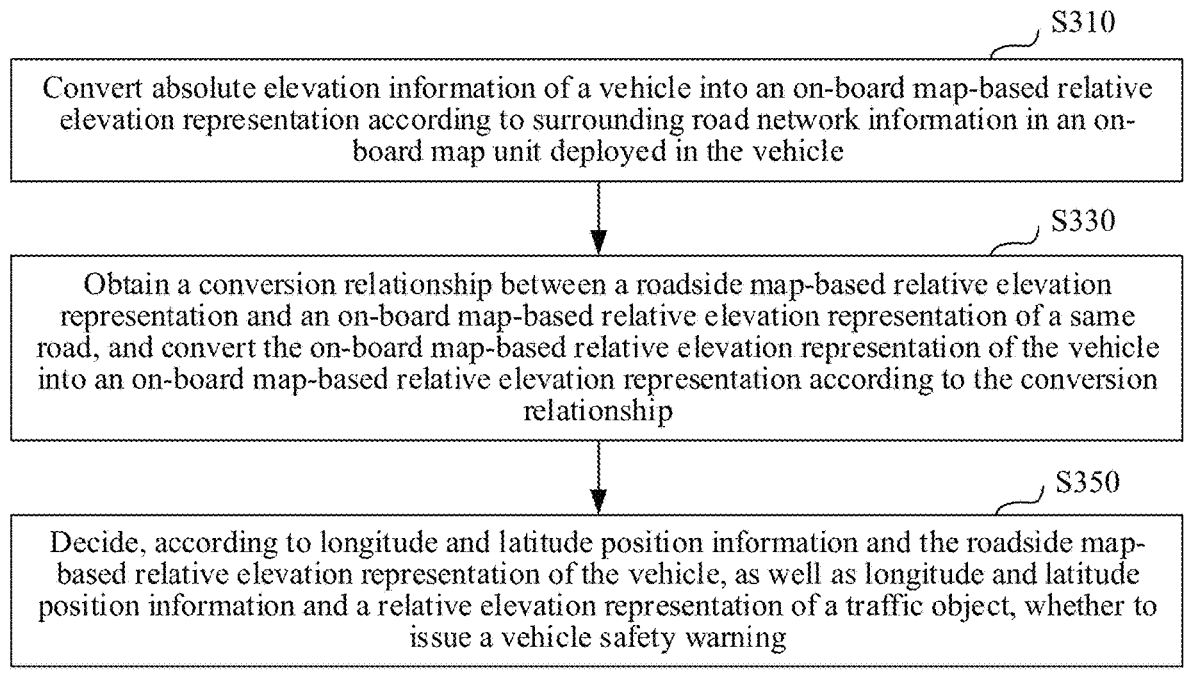
FIG. 6 is a flowchart of a vehicle making a vehicle safety early warning decision in a cooperative vehicle-infrastructure application according to another exemplary embodiment.

FIG. 6 is a flowchart of a vehicle making a vehicle safety early warning decision in a cooperative vehicle-infrastructure application according to another exemplary embodiment. As shown in FIG. 6, the decision-making procedure includes step S310 to step S350. A detailed description is as follows:

Step S310: Convert absolute elevation information of a vehicle into an on-board map-based relative elevation representation according to surrounding road network information in an on-board map unit deployed in the vehicle.

In this embodiment, the vehicle in the cooperative vehicle-infrastructure application may convert, according to the foregoing second relative elevation representation rule, the absolute elevation information of the vehicle into the on-board map-based relative elevation representation according to the surrounding road network information in the on-board map unit deployed in the vehicle. Details of the second relative elevation representation rule may be determined according to an actual application scenario, which is not limited here.

It is to be noted that the on-board map-based relative elevation representation of the vehicle is specifically a relative elevation representation of a road where the vehicle is located. That is, after on-board map-based relative elevation representations of roads are determined according to a spatial position relationship between a plurality of roads around the vehicle, the on-board map-based relative elevation representation of the road where the vehicle is located is used as the on-board map-based relative elevation representation of the vehicle.

Step S330: Obtain a conversion relationship between a roadside map-based relative elevation representation and an on-board map-based relative elevation representation of a same road, and convert the on-board map-based relative elevation representation of the vehicle into a roadside map-based relative elevation representation according to the conversion relationship.

In this embodiment, the objective of obtaining the conversion relationship between the roadside map-based relative elevation representation and the on-board map-based relative elevation representation of the same road is to make the on-board map unit and the roadside map unit have a unified understanding of the relative elevation representation of the same road based on the conversion relationship, to ensure the accuracy of the subsequent vehicle safety early warning decision.

According to the obtained conversion relationship, the vehicle can convert the on-board map-based relative elevation representation of the vehicle into the roadside map-based relative elevation representation. The relative elevation of the vehicle obtained after conversion represents a relative elevation representation consistent with a relative elevation representation of a traffic object in a roadside notification message. That is, both are roadside map-based relative elevation representations.

Step S350: Decide, according to longitude and latitude position information and the roadside map-based relative elevation representation of the vehicle, as well as longitude and latitude position information and the relative elevation representation of the traffic object, whether to issue a vehicle safety warning.

After the roadside map-based relative elevation representation of the vehicle is obtained, by comparing the roadside map-based relative elevation representation of the vehicle and the roadside map-based relative elevation representation of the traffic object, it can be determined whether the traffic object and the vehicle are on the same road. According to the longitude and latitude position information of the vehicle and the traffic object, a distance between the vehicle and the traffic object may be obtained. In this way, with reference to the actual cooperative vehicle-infrastructure application scenario, it is decided whether to issue a vehicle safety warning.

In this embodiment, three-dimensional position information (x1, y1, Δz1) of the vehicle is compared with three-dimensional position information (x2, y2, Δz2) of the traffic object to decide whether to issue a vehicle safety warning, to achieve accurate early warning for the vehicle. Δz1 represents the roadside map-based relative elevation of the vehicle, and Δz2 represents the roadside map-based relative elevation of the traffic object.

It is to be noted that, it is improper to decide not to issue a safety warning for the vehicle simply because the relative elevation representation or absolute elevation information of the vehicle is not equal to that of the traffic object. A decision needs to be made with reference to actual road network information. For example, in the road network information shown in FIG. 7, the roadside infrastructure perceives that a non-motor vehicle M1 is in a slow state on an upper elevated road, and the broadcasts a roadside notification message including longitude and latitude position information and roadside map-based relative elevation of the non-motor vehicle. After receiving the roadside notification message, a vehicle M2 can identify that the vehicle M2 and the non-motor vehicle M1 are driving in lanes at different layers. However, since the vehicle M2 will subsequently drive along the lane where the vehicle M1 is located, the driving safety of the vehicle M2 is still affected due to a low driving speed of the non-motor vehicle M1. If no safety warning is issued to the vehicle M2, a decision-making error still occurs.

Based on the problem, in other embodiments, if it is determined that the relative elevation representation of the vehicle is different from the relative elevation representation of the traffic object, vehicle information of the vehicle is obtained. According to the longitude and latitude position information and vehicle information of the vehicle, as well as the longitude and latitude position information of the traffic object, it is decided whether to issue a vehicle safety warning. The vehicle information is used to describe driving characteristics of the vehicle, such as a vehicle speed, heading, and the like.

In conclusion, under the condition that the vehicle and the roadside infrastructure in the cooperative vehicle-infrastructure application have consistent understanding of the relative elevation representation, an accurate vehicle early warning can be achieved through the relative elevation representation transmitted by the roadside infrastructure to the vehicle in real time, which is extremely applicable to a multi-layer road network scene including three-dimensional crossroads.

In another exemplary embodiment, as shown in FIG. 8, the process that roadside infrastructure generates a roadside message according to longitude and latitude position information and relative elevation representation of a traffic object may include step S410 to step S450. A detailed description is as follows:

Step S410: Determine, according to surrounding road network information of the roadside infrastructure, longitude and latitude position information and absolute elevation information of a road section reference point on a road section where the roadside infrastructure is located, and convert the absolute elevation information of the road section reference point into a roadside map-based relative elevation representation, the road section reference point being used to represent a position of the road section where the roadside infrastructure is located.

First, a roadside map unit and an on-board map unit maintain the longitude and latitude position information and absolute elevation information of all road sections of the surrounding road network within the coverage. That is, a road in the surrounding road network is composed of corresponding road sections. An end point of the road section is also known as a road section node. A road section usually has two road section nodes, and a center of the two road section nodes is a road section reference point on the road section. The position of the road section is represented by the road section reference point.

Figure 9:
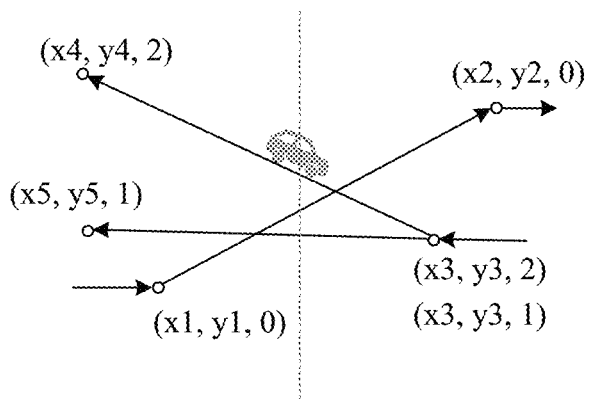
FIG. 9 is a schematic diagram of another exemplary vehicle surrounding road network information.

For example, in the exemplary surrounding road network information of the vehicle shown in FIG. 9, there is a road formed by a connection of road section end points (x1, y1, 0) and (x2, y2, 0), a road formed by a connection of road section end points (x3, y3, 1) and (x5, y5, 1), and a road formed by a connection of road section end points (x3, y3, 2) and (x4, y4, 2). The last element in the coordinates of the end point of the road segment represents a relative elevation representation of the corresponding road section.

In this embodiment, the longitude and latitude position information and the absolute elevation information of the road section reference point on a road section where the roadside infrastructure is located are determined according to surrounding road network information of the roadside infrastructure, and the absolute elevation information of the road section reference point is converted into a roadside map-based relative elevation representation. The objective is to accurately determine the position of the road section where the roadside infrastructure is located through the road section reference point.

Step S430: Calculate a relative position offset of the longitude and latitude position information of the traffic object relative to the longitude and latitude position information of the road section reference point, and calculate a relative elevation offset of the relative elevation representation of the traffic object relative to the relative elevation representation of the road section reference point.

If the longitude and latitude position information of the road section reference point is denoted by (x0, y0), and the roadside map-based relative elevation of the road section reference point is denoted by Δz0, the three-dimensional position information of the road section reference point may be denoted by (x0, y0, Δz0). If the longitude and latitude position information of the traffic object is denoted by (x1, y1), and the roadside map-based relative elevation of the traffic object is denoted by z1, the three-dimensional position information of the traffic object may be denoted by (x1, y1, Δz1). Based on this, the relative position offset of the longitude and latitude position information of the traffic object relative to the longitude and latitude position information of the road section reference point is denoted by (x1-x0, y1-y0, Δz1-Δz0).

Step S450: Add the relative position offset, the relative elevation offset, as well as the longitude and latitude position information and the relative elevation representation of the road section reference point to the roadside notification message to obtain a roadside notification message to be broadcast.

In this embodiment, the relative position offset, the relative elevation offset, as well as the longitude and latitude position information and relative elevation representation of the road section reference point are added to the roadside notification message, instead of directly providing the longitude and latitude position information and the roadside map-based relative elevation representation of the traffic object to the outside, which can reduce the resource overheads required for the external transmission of the message.

In some embodiments, the roadside infrastructure also determines a message type of the roadside notification message according to the cooperative vehicle-infrastructure application scenario, and then generates a roadside notification message matching the message type, so that the relative position offset, the relative elevation offset, as well as the longitude and latitude position information and the relative elevation representation of the road section reference point are added to the generated roadside notification message. The message type of the roadside notification message includes roadside information (RSI) or basic safety message (RSM). The roadside information is usually used in road construction, speed limit sign, overspeed early warning, bus lane early warning and other scenarios. The basic safety message is usually used to identify a vehicle accident, vehicle abnormality, foreign matter intrusion and other scenarios.

After receiving the roadside notification message broadcast by the roadside infrastructure, the vehicle on the road around the roadside infrastructure obtains, from the roadside notification message, the longitude and latitude position information and the relative elevation information of the road section reference point on the road section where the roadside infrastructure is located, and the relative position offset of the longitude and latitude position information of the traffic object relative to the longitude and latitude position information of the road section reference point, and a relative elevation offset of the relative elevation representation of the traffic object relative to a relative elevation representation of the road section reference point. Then, the vehicle restores the longitude and latitude position information of the traffic object according to the longitude and latitude position information and the relative position offset of the road section reference point, and restores the relative elevation representation of the traffic object according to the relative elevation information and the relative elevation offset of the road section reference point. Subsequently, the vehicle safety early warning decision can be made according to the longitude and latitude position information and the roadside map-based relative elevation representation of the traffic object.

Figure 10:
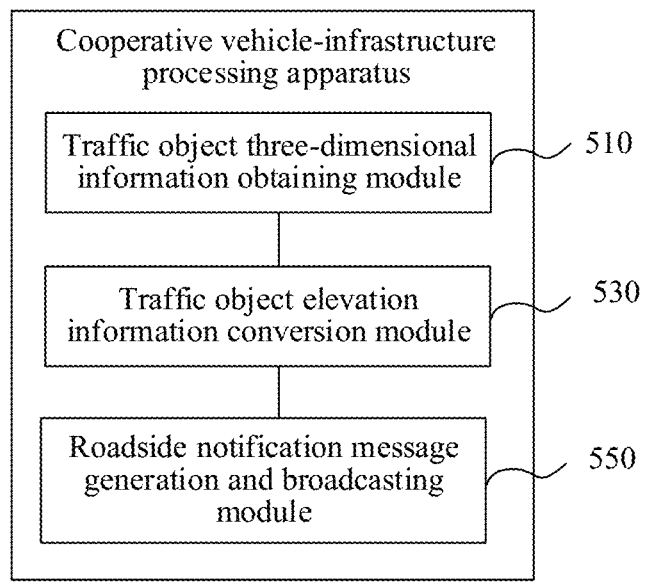
FIG. 10 is a block diagram of a cooperative vehicle-infrastructure processing apparatus according to an exemplary embodiment.

FIG. 10 is a block diagram of a cooperative vehicle-infrastructure processing apparatus according to an exemplary embodiment. As shown in FIG. 10, the apparatus includes:

a traffic object three-dimensional information obtaining module 510, configured to obtain longitude and latitude position information and absolute elevation information of a traffic object on a road through roadside infrastructure, the traffic object including at least one of a road event, a traffic sign, and a traffic participant; a traffic object elevation information conversion module 530, configured to convert the absolute elevation information of the traffic object into a roadside map-based relative elevation representation according to surrounding road network information in a roadside map unit deployed in the roadside infrastructure, the roadside map-based relative elevation representation being used to describe a spatial position relationship between the road where the traffic object is located and a plurality of roads around the roadside infrastructure in the surrounding road network information; and a roadside notification message generation and broadcasting module 550, configured to generate a roadside notification message according to the longitude and latitude position information and the relative elevation representation of the traffic object, and broadcast the roadside notification message, a broadcast range of the roadside notification message covering at least the plurality of roads, so that vehicles on the plurality of roads make vehicle safety early warning decisions based on the roadside notification message.

The apparatus provided in this embodiment implements the safety early warning for the vehicle on the road in cooperation with the roadside infrastructure. The roadside infrastructure can identify the road event, the traffic object, the traffic participant and other traffic objects on the road, and broadcast the longitude and latitude position information and the relative elevation representation of the traffic object, so that the vehicle in the cooperative vehicle-infrastructure application can implement a more accurate vehicle safety early warning based on the relevant information of the traffic objects.

In another exemplary embodiment, the apparatus further includes:

a roadside notification message receiving module, configured to receive a roadside notification message issued by roadside infrastructure, the roadside notification message being generated by the roadside infrastructure according to longitude and latitude position information and relative elevation representation of a traffic object, the traffic object including at least one of a road event, a traffic sign, and a traffic participant; a vehicle three-dimensional information obtaining module, configured to obtain longitude and latitude position information and absolute elevation information of the vehicle; and a vehicle safety early warning decision-making module, configured to make a vehicle safety early warning decision according to the longitude and latitude position information and the absolute elevation information of the vehicle, as well as the longitude and latitude position information and the relative elevation representation of the traffic object in the roadside notification message.

In another exemplary embodiment, the vehicle safety early warning decision-making module includes:

a conversion relationship obtaining unit, configured to obtain a conversion relationship between a roadside map-based relative elevation representation and an on-board map-based relative elevation representation of a same road, the on-board map-based relative elevation representation being obtained according to surrounding road network information in an on-board map unit deployed in the vehicle; an approximate absolute elevation obtaining unit, configured to convert the relative elevation representation of the traffic object into the on-board map-based relative elevation representation according to the conversion relationship, and determine approximate absolute elevation information of the traffic object based on the relative elevation representation obtained through conversion; and a security warning decision-making unit, configured to decide, according to the longitude and latitude position information and the absolute elevation information of the vehicle, as well as the longitude and latitude position information and the approximate absolute elevation information of the traffic object, whether to issue a vehicle safety warning.

In another exemplary embodiment, the approximate absolute elevation obtaining unit includes:

a road layer number determining subunit, configured to determine a road layer number corresponding to the road where the traffic object is located in the surrounding road network information of the vehicle according to the relative elevation representation obtained through conversion; and an approximate absolute elevation determining subunit, configured to determine the approximate absolute elevation information of the traffic object according to the road layer number and map data corresponding to the surrounding road network information of the vehicle.

In another exemplary embodiment, the vehicle safety early warning decision-making module includes:

an elevation information conversion unit, configured to convert the absolute elevation information of the vehicle into an on-board map-based relative elevation representation according to surrounding road network information in an on-board map unit deployed in the vehicle; a conversion relationship obtaining and using unit, configured to obtain a conversion relationship between a roadside map-based relative elevation representation and an on-board map-based relative elevation representation of a same road, and convert the on-board map-based relative elevation representation of the vehicle into a roadside map-based relative elevation representation according to the conversion relationship; and a security warning decision-making unit, configured to decide, according to the longitude and latitude position information and the roadside map-based relative elevation representation of the vehicle, as well as the longitude and latitude position information and the relative elevation representation of the traffic object, whether to issue a vehicle safety warning.

In another exemplary embodiment, the safety warning decision-making unit includes:

a driving feature acquisition subunit, configured to obtain a driving feature of the vehicle, if it is determined that the relative elevation representation of the traffic object is different from the relative elevation representation of the vehicle based on the roadside map, the driving feature including at least one of a vehicle speed and a vehicle course; and a decision-making subunit, configured to decide, according to the longitude and latitude position information and the driving feature of the vehicle, as well as the longitude and latitude position information of the traffic object, whether to issue a safety warning for the current vehicle.

In another exemplary embodiment, the conversion relationship is obtained from an on-board map server, and the on-board map server is configured to provide a map data service for the vehicle and maintain the conversion relationship according to communication with the roadside infrastructure.

In another exemplary embodiment, the apparatus further includes:

a relative offset obtaining module, configured to obtain, from the roadside notification message, longitude and latitude position information and relative elevation information of a road section reference point on a road section where the roadside infrastructure is located, a relative position offset of the longitude and latitude position information of the traffic object relative to the longitude and latitude position information of the road section reference point, and a relative elevation offset of the relative elevation representation of the traffic object relative to a relative elevation representation of the road section reference point; and a relative offset restoring module, configured to restore the longitude and latitude position information of the traffic object according to the longitude and latitude position information and the relative position offset of the road section reference point, and restore the relative elevation representation of the traffic object according to the relative elevation information and the relative elevation offset of the road section reference point.

In another exemplary embodiment, the roadside notification message generation and broadcasting module 550 includes:

a reference information obtaining unit, configured to determine, according to the surrounding road network information, longitude and latitude position information and absolute elevation information of a road section reference point on a road section where the roadside infrastructure is located, and convert the absolute elevation information of the road section reference point into a roadside map-based relative elevation representation, the road section reference point being used to represent a position of the road section where the roadside infrastructure is located; an offset calculation unit, configured to calculate a relative position offset of the longitude and latitude position information of the traffic object relative to the longitude and latitude position information of the road section reference point, and calculate a relative elevation offset of the relative elevation representation of the traffic object relative to the relative elevation representation of the road section reference point; and a message generation unit, configured to add the relative position offset, the relative elevation offset, as well as the longitude and latitude position information and the relative elevation representation of the road section reference point to the roadside notification message to obtain a roadside notification message to be broadcast.

In another exemplary embodiment, the roadside notification message generation and broadcasting module 550 further includes:

a message type determining unit, configured to determine a message type of the roadside notification message according to a cooperative vehicle-infrastructure application scenario, the message type including roadside information or a basic safety message; and a message generation unit, configured to generate a roadside notification message matching the message type, so that the relative position offset, the relative elevation offset, as well as the longitude and latitude position information and the relative elevation representation of the road section reference point are added to the generated roadside notification message.

In another exemplary embodiment, a perceptual positioning unit and an in-vehicle wireless communication unit are further deployed in the roadside infrastructure. The traffic object three-dimensional information obtaining module 510 includes:

a traffic object perception unit, configured to perceive, through the perceptual positioning unit, the traffic object on the road where the roadside infrastructure is located, and obtain the longitude and latitude position information and the absolute elevation information of the perceived traffic object; and a perceptual information transmitting unit, configured to transmit the longitude and latitude position information and the absolute elevation information of the perceived traffic object to the in-vehicle wireless communication unit and the roadside map unit respectively, so that the roadside map unit converts the absolute elevation information of the traffic object to the roadside map-based relative elevation representation, and the in-vehicle wireless communication unit generates the roadside notification message according to the longitude and latitude position information and the relative elevation representation of the traffic object, and broadcasts the roadside notification message.

It is to be noted that the apparatuses and the methods provided in the foregoing embodiments belong to the same idea. Specific operation manners of the modules and the units have been described in detail in the method embodiments. Details are not described herein again.

Figure 11:
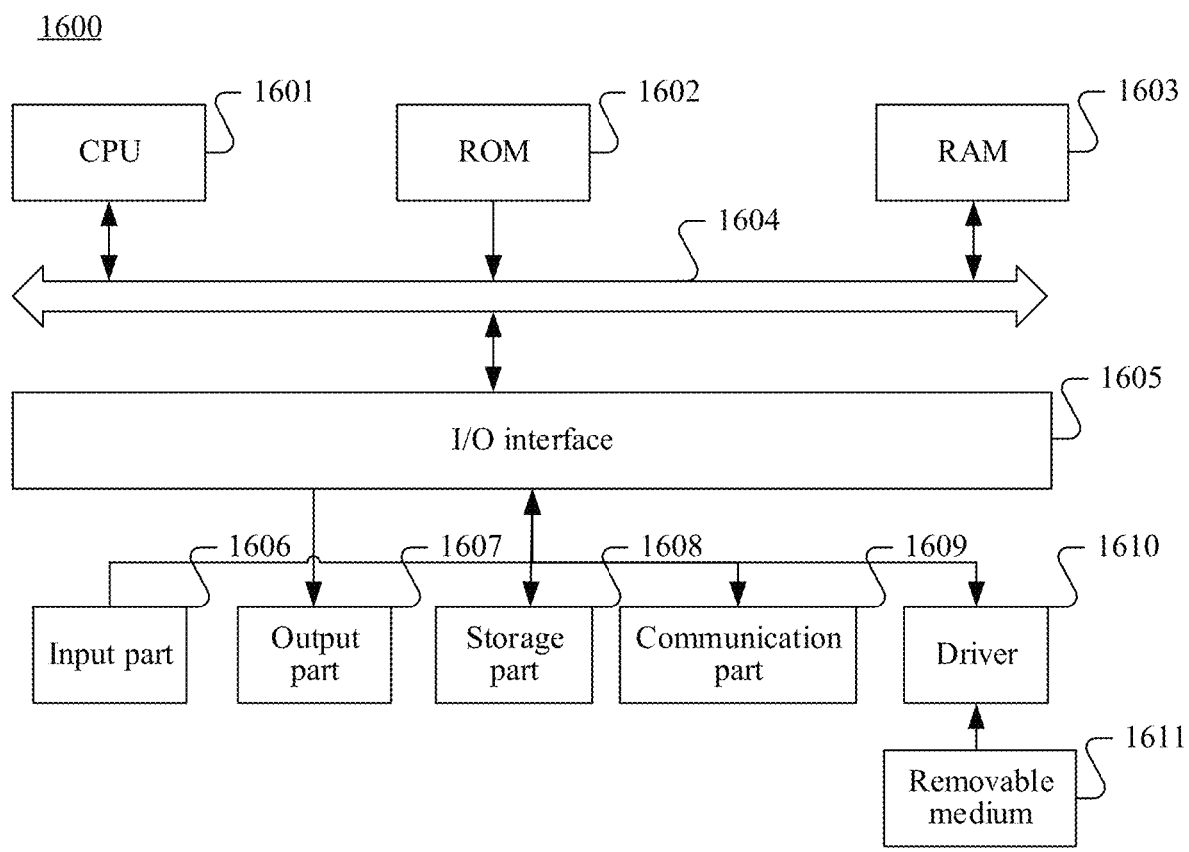
FIG. 11 is an exemplary schematic structural diagram of a computer system for implementing an electronic device according to an embodiment of this application.

FIG. 11 is a schematic structural diagram of a computer system adapted to implement an electronic device according to an embodiment of this application.

It is to be noted that the computer system 1600 of the electronic device shown in FIG. 11 is merely an example, and does not constitute any limitation on functions and use ranges of the embodiments of this application.

As shown in FIG. 11, the computer system 1600 includes a central processing unit (CPU) 1601, which may perform various suitable actions and processing based on a program stored in a read-only memory (ROM) 1602 or a program loaded from a storage part 1608 into a random access memory (RAM) 1603, for example, perform the method described in the foregoing embodiments. The RAM 1603 further stores various programs and data required for operating the system. The CPU 1601, the ROM 1602, and the RAM 1603 are connected to each other by using a bus 1604. An input/output (I/O) interface 1605 is also connected to the bus 1604.

The following components are connected to the I/O interface 1605: an input part 1606 including a keyboard, a mouse, and the like; an output part 1607, including a cathode ray tube (CRT), a liquid crystal display (LCD), a loudspeaker and the like; a storage part 1608 including a hard disk and the like; and a communication part 1609 including a network interface card such as a local area network (LAN) card, a modem and the like. The communication part 1609 performs communication processing by using a network such as the Internet. A driver 1610 is also connected to the I/O interface 1605 as required. A removable medium 1611, such as a magnetic disk, an optical disc, a magneto-optical disk, or a semiconductor memory, is installed on the drive 1610 as required, so that a computer program read from the removable medium is installed into the storage part 1608 as required.

Particularly, according to an embodiment of this application, the processes described in the following by referring to the flowcharts may be implemented as a computer software program. For example, an embodiment of this application includes a computer program product. The computer program product includes a computer program stored in a computer-readable medium. The computer program includes a computer program used for performing the method shown in the flowchart. In such an embodiment, by using the communication part 1609, the computer program may be downloaded and installed from a network, and/or installed from the removable medium 1611. When the computer program is executed by the CPU 1601, the various functions defined in the system of this application are executed.

It is to be noted that the computer-readable medium shown in this embodiment of this application may be a computer-readable signal medium or a computer-readable storage medium or any combination thereof. The computer-readable storage medium may be, such as an electric, magnetic, optical, electromagnetic, infrared, or semi-conductive system, apparatus, or device, or any combination of the above. More specific examples of the computer-readable storage medium may include, but are not limited to: an electrical connection having one or more wires, a portable computer magnetic disk, a hard disk, a RAM, a ROM, an erasable programmable read-only memory (EPROM), a flash memory, an optical fiber, a compact disk read-only memory (CD-ROM), an optical storage device, a magnetic storage device, or any appropriate combination thereof. In this application, the computer-readable storage medium may be any tangible medium including or storing a program, and the program may be used by or used in combination with an instruction execution system, an apparatus, or a device. In this application, the computer-readable signal medium may include a data signal propagated in a baseband or as part of a carrier, and stores a computer-readable computer program. The propagated data signal may be in a plurality of forms, including, but not limited to, an electromagnetic signal, an optical signal, or any appropriate combination thereof. The computer-readable signal medium may further be any computer-readable medium in addition to a computer-readable storage medium. The computer-readable medium may send, propagate, or transmit a program that is used by or used in combination with an instruction execution system, apparatus, or device. The computer program included in the computer-readable medium may be transmitted by using any suitable medium, including but not limited to: a wireless medium, a wired medium, or the like, or any suitable combination thereof.

The flowcharts and block diagrams in the accompanying drawings illustrate possible system architectures, functions and operations that may be implemented by a system, a method, and a computer program product according to various embodiments of this application. Each box in a flowchart or a block diagram may represent a module, a program segment, or a part of code. The module, the program segment, or the part of code includes one or more executable instructions used for implementing specified logic functions. It is also to be noted that in some implementations used as substitutes, functions annotated in boxes may alternatively occur in a sequence different from that annotated in an accompanying drawing. For example, two boxes shown in succession may actually be performed basically in parallel, and sometimes the two boxes may be performed in a reverse sequence. This is determined by a related function. It is also to be noted that each block in the block diagram or the flowchart, and a combination of blocks in the block diagram or the flowchart may be implemented by using a dedicated hardware-based system that performs a specified function or operation, or may be implemented by using a combination of dedicated hardware and computer instructions.

A related unit described in the embodiments of this application may be implemented in a software manner, or may be implemented in a hardware manner, and the unit described can also be set in a processor. Names of these units do not constitute a limitation on the units in a case.

Another embodiment of this application provides a computer-readable storage medium, storing a computer program, the computer program, when executed by a processor, implementing the cooperative vehicle-infrastructure processing method described above. The computer-readable storage medium may be included in the electronic device described in the foregoing embodiments, or may exist alone and is not assembled in the electronic device.

Another embodiment of this application provides a computer program product or a computer program, including computer instructions, the computer instructions being stored in a computer-readable storage medium. A processor of a computer device reads the computer instructions from the computer-readable storage medium, and executes the computer instructions, causing the computer device to perform the cooperative vehicle-infrastructure processing method provided in the foregoing embodiments.

The foregoing descriptions are merely preferable exemplary embodiments of this application, and are not intended to limit the implementations of this application. A person of ordinary skill in the art can conveniently make corresponding variations or modifications according to the main idea and spirit of this application. Therefore, the protection scope of this application shall be subject to the protection scope of the claims.

What is claimed is:

1. A cooperative vehicle-infrastructure processing method, performed by roadside infrastructure in a cooperative vehicle infrastructure system (CVIS), the method comprising:
    obtaining longitude and latitude position information and absolute elevation information of a traffic object on a road through the roadside infrastructure, the traffic object comprising at least one of: a road event, a traffic sign, and a traffic participant;
    converting the absolute elevation information of the traffic object into a roadside map-based relative elevation representation according to surrounding road network information in a roadside map unit deployed in the roadside infrastructure, the roadside map-based relative elevation representation being used to describe a spatial position relationship between the road where the traffic object is located and a plurality of roads around the roadside infrastructure in the surrounding road network information;
    determining, according to the surrounding road network information of the roadside infrastructure, reference longitude and latitude position information and absolute elevation information of a road section reference point on a road section where the roadside infrastructure is located;
    converting the absolute elevation information of the road section reference point into a reference roadside map-based relative elevation representation, the road section reference point being used to represent a position of the road section where the roadside infrastructure is located;
    calculating a relative position offset of the longitude and latitude position information of the traffic object relative to the reference longitude and latitude position information of the road section reference point, and calculating a relative elevation offset of the roadside map-based relative elevation representation of the traffic object relative to the reference roadside map-based relative elevation representation of the road section reference point; and
    generating a roadside notification message and including in the roadside notification message the relative position offset and the relative elevation offset rather than the longitude and latitude position information and the roadside map-based relative elevation representation of the traffic object, and broadcasting the roadside notification message, a broadcast range of the roadside notification message covering at least the plurality of roads around the roadside infrastructure, so that vehicles on the plurality of roads make vehicle safety early warning decisions based on the roadside notification message.

2. The method according to claim 1, wherein before including the relative position offset and the relative elevation offset in the roadside notification message, the method further comprises:
    determining a message type of the roadside notification message according to a cooperative vehicle-infrastructure application scenario, the message type comprising roadside information or a basic safety message; and
    generating the roadside notification message matching the message type to include the relative position offset and the relative elevation offset.

3. The method according to claim 1, wherein a perceptual positioning unit and a roadside wireless communication unit are further deployed in the roadside infrastructure; and obtaining the longitude and latitude position information and the absolute elevation information of the traffic object comprises:
    perceiving, through the perceptual positioning unit, the traffic object on the road where the roadside infrastructure is located, and obtaining the longitude and latitude position information and the absolute elevation information of the perceived traffic object; and
    transmitting the longitude and latitude position information and the absolute elevation information of the perceived traffic object to the roadside wireless communication unit and the roadside map unit respectively, so that the roadside map unit converts the absolute elevation information of the traffic object into the roadside map-based relative elevation representation, and the roadside wireless communication unit generates the roadside notification message according to the longitude and latitude position information and the roadside map-based relative elevation representation of the traffic object, and broadcasts the roadside notification message.

4. A cooperative vehicle-infrastructure processing method, performed by a vehicle in a cooperative vehicle infrastructure system (CVIS), comprising:
    receiving a roadside notification message issued by a roadside infrastructure, the roadside notification message being generated by the roadside infrastructure according to but does not directly include longitude and latitude position information and a relative elevation representation of a traffic object, the traffic object comprising at least one of a road event, a traffic sign, and a traffic participant;
    obtaining, from the roadside notification message, a relative position offset of the longitude and latitude position information of the traffic object relative to a reference longitude and latitude position information of a road section reference point and a relative elevation offset of the relative elevation representation of the traffic object relative to a reference relative elevation representation of the road section reference point, the road section reference point being on a road section where the roadside infrastructure is located;
    restoring the longitude and latitude position information of the traffic object according to the reference longitude and latitude position information and the relative position offset of the road section reference point;
    restoring the relative elevation representation of the traffic object according to the reference relative elevation representation and the relative elevation offset of the road section reference point;
    obtaining longitude and latitude position information and absolute elevation information of the vehicle; and
    making a vehicle safety early warning decision according to the longitude and latitude position information and the absolute elevation information of the vehicle, as well as the restored longitude and latitude position information and the restored relative elevation representation of the traffic object.

5. The method according to claim 4, wherein the making, by the vehicle, the vehicle safety early warning decision according to the longitude and latitude position information and the absolute elevation information of the vehicle, as well as the restored longitude and latitude position information and the restored relative elevation representation of the traffic object comprises:
- obtaining a conversion relationship between a roadside map-based relative elevation representation and an on-board map-based relative elevation representation of a same road, the on-board map-based relative elevation representation being obtained according to surrounding road network information in an on-board map unit deployed in the vehicle;
- converting the restored relative elevation representation of the traffic object into an on-board map-based relative elevation representation according to the conversion relationship, and determining an approximate absolute elevation information of the traffic object based on the on-board map-based relative elevation representation of the traffic object; and
- deciding, according to the longitude and latitude position information and the absolute elevation information of the vehicle, as well as the restored longitude and latitude position information and the approximate absolute elevation information of the traffic object, whether to issue a vehicle safety warning.

6. The method according to claim 5, wherein the determining the approximate absolute elevation information of the traffic object based on the on-board map-based relative elevation representation of the traffic object comprises:
- determining a road layer number corresponding to a road where the traffic object is located in the surrounding road network information of the vehicle according to the on-board map-based relative elevation representation of the traffic object; and
- determining the approximate absolute elevation information of the traffic object according to the road layer number and map data corresponding to the surrounding road network information of the vehicle.

7. The method according to claim 5, wherein the conversion relationship is obtained from a map server, and the map server is configured to provide a map data service for the vehicle and maintain the conversion relationship according to communication with the roadside infrastructure.

8. The method according to claim 4, wherein the making the vehicle safety early warning decision according to the longitude and latitude position information and the absolute elevation information of the vehicle, as well as the restored longitude and latitude position information and the restored relative elevation representation of the traffic object comprises:
- converting the absolute elevation information of the vehicle into an on-board map-based relative elevation representation according to surrounding road network information in an on-board map unit deployed in the vehicle;
- obtaining a conversion relationship between a roadside map-based relative elevation representation and an on-board map-based relative elevation representation of a same road, and converting the on-board map-based relative elevation representation of the vehicle into a roadside map-based relative elevation representation according to the conversion relationship; and
- deciding, according to the longitude and latitude position information of the vehicle and the roadside map-based relative elevation representation, and the restored longitude and latitude position information and the restored relative elevation representation of the traffic object, whether to issue a vehicle safety warning.

9. The method according to claim 8, wherein the deciding, according to the longitude and latitude position information of the vehicle and the roadside map-based relative elevation representation, and the restored longitude and latitude position information and the restored relative elevation representation of the traffic object, whether to issue the vehicle safety warning comprises:
- obtaining a driving feature of the vehicle in response to determining that the relative elevation representation of the traffic object is different from the roadside map-based relative elevation representation of the vehicle, the driving feature comprising at least one of a vehicle speed and a vehicle course; and
- deciding, according to the longitude and latitude position information and the driving feature of the vehicle, as well as the restored longitude and latitude position information of the traffic object, whether to issue the vehicle safety warning for the vehicle.

10. The method according to claim 8, wherein the conversion relationship is obtained from a map server, and the map server is configured to provide a map data service for the vehicle and maintain the conversion relationship according to communication with the roadside infrastructure.

11. A cooperative vehicle-infrastructure processing apparatus, comprising:
- a memory storing a plurality of instructions; and
- a processor configured to execute the plurality of instructions, and upon execution of the plurality of instructions, is configured to:
  - receive a roadside notification message issued by a roadside infrastructure, the roadside notification message being generated by the roadside infrastructure according to but does not directly include longitude and latitude position information and a relative elevation representation of a traffic object, the traffic object comprising at least one of a road event, a traffic sign, and a traffic participant;
  - obtain, from the roadside notification message, a relative position offset of the longitude and latitude position information of the traffic object relative to a reference longitude and latitude position information of a road section reference point and a relative elevation offset of the relative elevation representation of the traffic object relative to a reference relative elevation representation of the road section reference point, the road section reference point being on a road section where the roadside infrastructure is located;
  - restore the longitude and latitude position information of the traffic object according to the reference longitude and latitude position information and the relative position offset of the road section reference point;
  - restore the relative elevation representation of the traffic object according to the reference relative elevation representation and the relative elevation offset of the road section reference point;
  - obtain longitude and latitude position information and absolute elevation information of a vehicle; and
  - make a vehicle safety early warning decision according to the longitude and latitude position information and the absolute elevation information of the vehicle, as well as the restored longitude and latitude position information and the restored relative elevation representation of the traffic object.

12. The cooperative vehicle-infrastructure processing apparatus of claim 11, wherein the processor is further configured to:
- obtain a conversion relationship between a roadside map-based relative elevation representation and an on-board map-based relative elevation representation of a same road, the on-board map-based relative elevation representation being obtained according to surrounding road network information in an on-board map unit deployed in the vehicle;
- convert the restored relative elevation representation of the traffic object into an on-board map-based relative elevation representation according to the conversion relationship, and determine an approximate absolute elevation information of the traffic object based on the on-board map-based relative elevation representation of the traffic object; and
- decide, according to the longitude and latitude position information and the absolute elevation information of the vehicle, as well as the restored longitude and latitude position information and the approximate absolute elevation information of the traffic object, whether to issue a vehicle safety warning.

13. The cooperative vehicle-infrastructure processing apparatus of claim 12, wherein the conversion relationship is obtained from a map server, and the map server is configured to provide a map data service for the vehicle and maintain the conversion relationship according to communication with the roadside infrastructure.

14. The cooperative vehicle-infrastructure processing apparatus of claim 12, wherein the processor is further configured to:
- determine a road layer number corresponding to a road where the traffic object is located in the surrounding road network information of the vehicle according to the on-board map-based relative elevation representation of the traffic object; and
- determine the approximate absolute elevation information of the traffic object according to the road layer number and map data corresponding to the surrounding road network information of the vehicle.

15. The cooperative vehicle-infrastructure processing apparatus of claim 11, wherein the processor is further configured to:
- convert the absolute elevation information of the vehicle into an on-board map-based relative elevation representation according to surrounding road network information in an on-board map unit deployed in the vehicle;
- obtain a conversion relationship between a roadside map-based relative elevation representation and an on-board map-based relative elevation representation of a same road, and convert the on-board map-based relative elevation representation of the vehicle into a roadside map-based relative elevation representation according to the conversion relationship; and
- decide, according to the longitude and latitude position information of the vehicle and the roadside map-based relative elevation representation, and the restored longitude and latitude position information and the restored relative elevation representation of the traffic object, whether to issue a vehicle safety warning.

16. The cooperative vehicle-infrastructure processing apparatus of claim 15, wherein the conversion relationship is obtained from a map server, and the map server is configured to provide a map data service for the vehicle and maintain the conversion relationship according to communication with the roadside infrastructure.

17. The cooperative vehicle-infrastructure processing apparatus of claim 15, wherein the processor is further configured to:
- obtain a driving feature of the vehicle in response to determining that the relative elevation representation of the traffic object is different from the roadside map-based relative elevation representation of the vehicle, the driving feature comprising at least one of a vehicle speed and a vehicle course; and
- decide, according to the longitude and latitude position information and the driving feature of the vehicle, as well as the restored longitude and latitude position information of the traffic object, whether to issue the vehicle safety warning for the vehicle.

* * * * *